Figure 2:
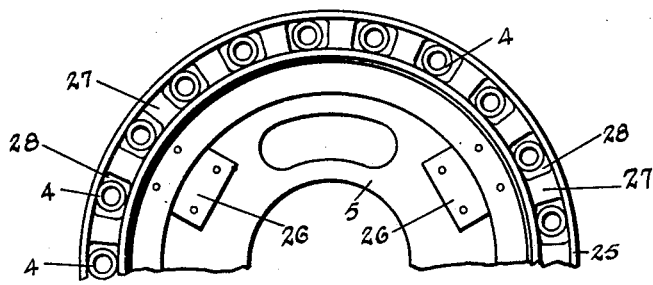

Dec. 11, 1934.  B. H. URSCHEL  1,983,584
PROCESS OF SHAPING METAL TUBES
Filed March 29, 1930   6 Sheets-Sheet 1

Inventor
Bertis H. Urschel
By Faust F. Crampton
Attorney

Dec. 11, 1934.   B. H. URSCHEL   1,983,584
PROCESS OF SHAPING METAL TUBES
Filed March 29, 1930   6 Sheets-Sheet 2

Inventor
Bertis H. Urschel
By Faust & Crampton
Attorney

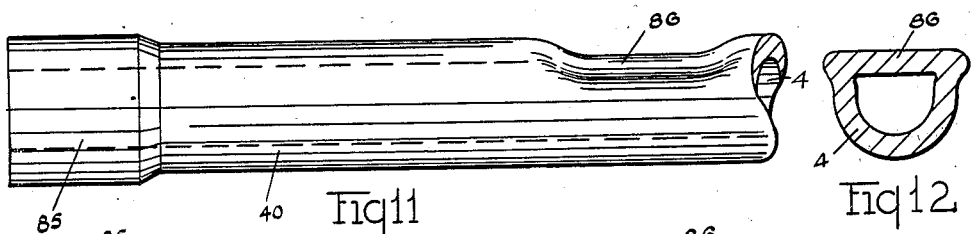
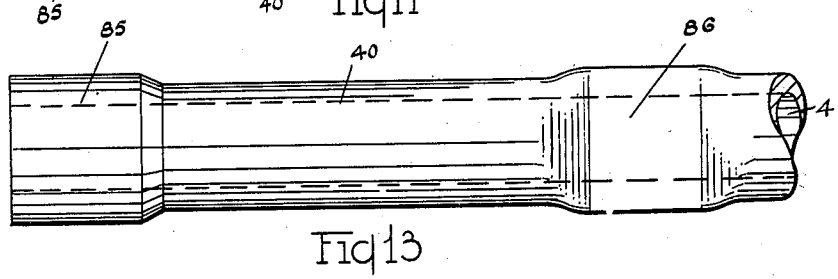
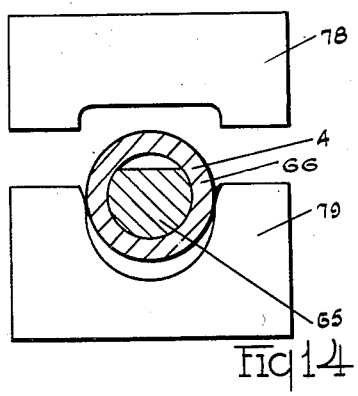
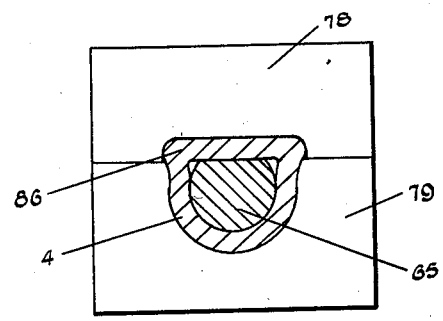
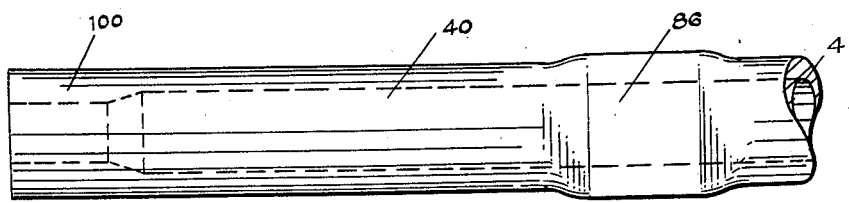
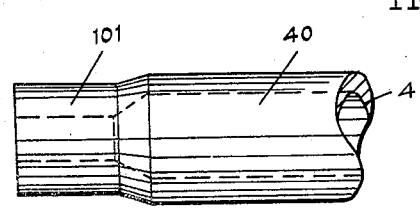
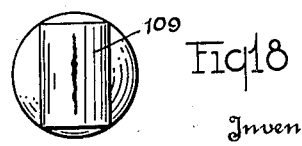

Dec. 11, 1934.   B. H. URSCHEL   1,983,584
PROCESS OF SHAPING METAL TUBES
Filed March 29, 1930   6 Sheets-Sheet 4

Inventor
Bertis H. Urschel
by Faust F. Campbell
Attorney

Dec. 11, 1934.     B. H. URSCHEL     1,983,584
PROCESS OF SHAPING METAL TUBES
Filed March 29, 1930     6 Sheets-Sheet 5
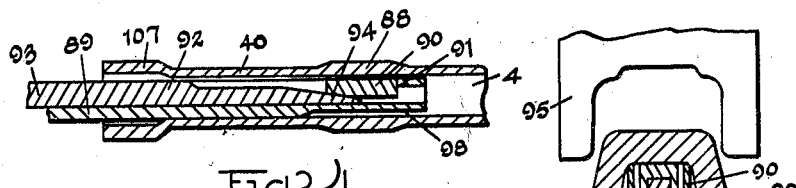
Fig24
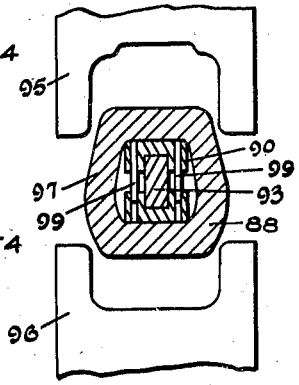
Fig26
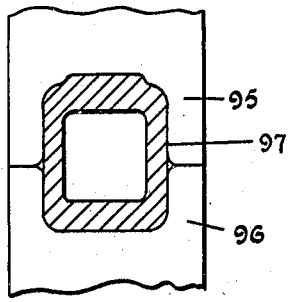
Fig25
Fig27
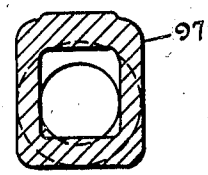
Fig28
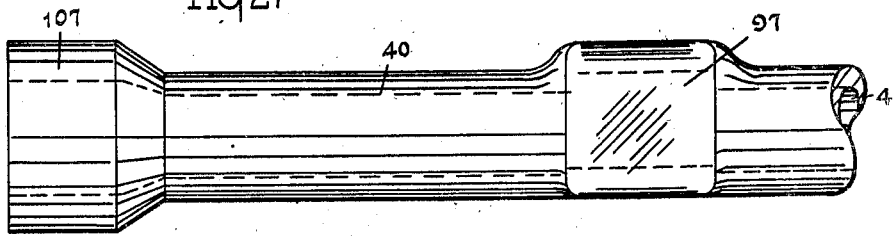
Fig29
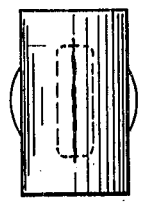
Fig30
Inventor
Bertis H. Urschel
By
Attorney Dec. 11, 1934.     B. H. URSCHEL     1,983,584
PROCESS OF SHAPING METAL TUBES
Filed March 29, 1930     6 Sheets-Sheet 6

Inventor
Bertis H. Urschel
By Fausst F. Crampton
Attorney

Patented Dec. 11, 1934

1,983,584

UNITED STATES PATENT OFFICE 1,983,584

PROCESS OF SHAPING METAL TUBES

Bertis H. Urschel, Bowling Green, Ohio, assignor to Urschel Engineering Company, Toledo, Ohio, a corporation of Ohio Application March 29, 1930, Serial No. 439,955

8 Claims. (Cl. 29—153.1)

My invention has for its object to provide a process for efficiently shaping steel tubes to desired shapes. The invention particularly relates to processes of formation of parts of steel tubes to increase their resistance to the stresses that they may be subjected to. The parts are so formed as to greatly increase their torsional, or shearing, resistance while, at the same time, the body portions of the tubes provide a light weight beam, or strut, or brace. The invention is advantageously applied to shaping parts of tubes to form structures, that will transmit stresses and strains throughout the cross sectional area of the juncture with the thinner integrally formed part of the body of the tube. Thus the tube may be provided with thickened portions to form connecting parts, that will most efficiently withstand torque, or shearing, stresses and transmit the strains to the thin wall that forms the body of the tube. Thus very thin wall tubes may be used for transmitting pressures, or for sustaining pressures at, or between, connected parts or points of the member.

The invention may be used in connection with the formation of load carrying and torque transmitting, or shearing resisting, members of different kinds and that are usable for different purposes. As illustrative of the various adaptations of the invention, the formation of main or central axles, of the type that are supported by stub axles, is selected as best illustrative of the steps of the process, referred to herein, since it involves and utilizes steps in the process of the production of constructions, that are subjected to many forms of stresses. Such constructions contain many features, that the process anticipates and provides for, to enable the constructions to efficiently withstand the torque and stresses to which axles are subjected.

In carrying out the invention, portions of steel tubes, preferably thin seamless wall tubes, are heated so as to insure a uniform heat throughout the said parts while, preferably, adjoining parts are maintained cool to reduce the length of the tapering temperature in such adjoining parts. The said adjoining parts may be shielded while the portions are heated. This reduces the length of time required to chill the said adjoining parts and prevents the formation of an extended tapering temperature from the chilled portions into the portions having the uniform higher temperature during the chilling. The temperature of the said adjoining parts may be kept down by a shield that forms a part of the heating furnace, or by a heat conductor, or by directing currents of a fluid against the said adjoining parts of the tubes, or through the chamber in which such adjoining parts are located.

If it is desired to heat two or more parts of each tube at the same time, the tube may be located in two separated heat zones and the intermediate part of the tubes may be shielded, or cooled, by a chilling means to keep the temperature of the tube, contiguous to the heated portions, down.

The heated portions of the tube are then manipulated to produce the desired configuration in heated portions. In the formation of the axle, which has been selected to show a practical adaptation of the process to practical uses, portions of the axle are formed to connect the ends with the stub axles of the vehicle and to the frame or the springs of the vehicle. These parts are so shaped as to efficiently withstand the torque and carry the load to which such axles are, in their use, ordinarily subjected, it being understood, however, that the shapes may partake of different forms.

The invention consists in other features and advantages that will appear from the following description, and upon examination of the drawings. Also processes, containing the invention, may be varied in their steps and, to illustrate a practical application of the invention, I have selected a process that involves the use of the invention, as an example of various processes of the same general character that embody the invention, it being understood, that variations may be performed without departing from the spirit of the invention. Different structural forms, illustrating different formations of the metal of tubes, are shown in the accompanying drawings to enable a complete description and disclosure of my invention.

Figure 1:
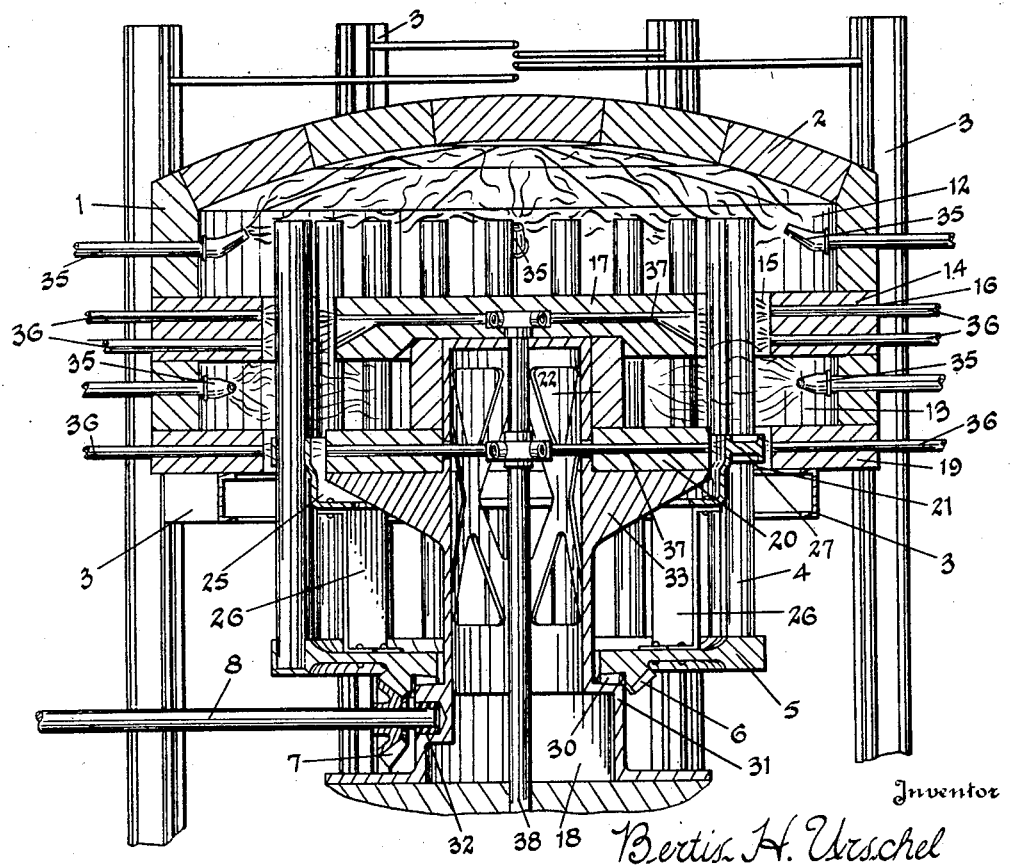
Figure 3:
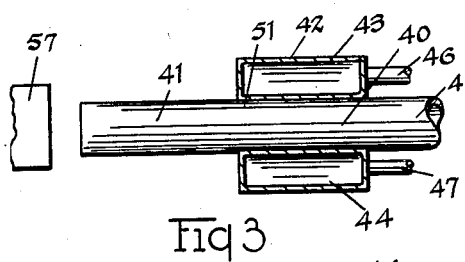
Figure 4:
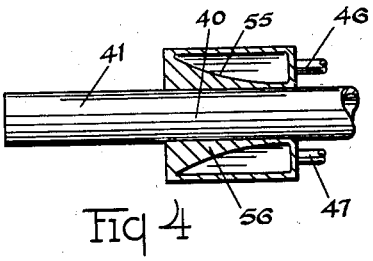
Figure 5:
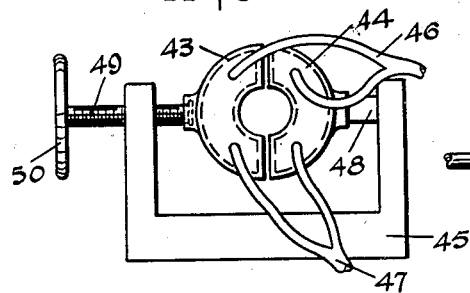
Figure 7:
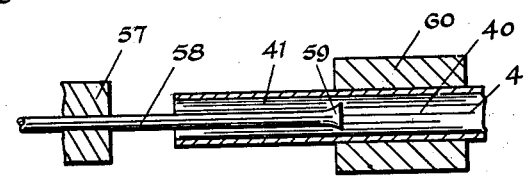
Figure 6:
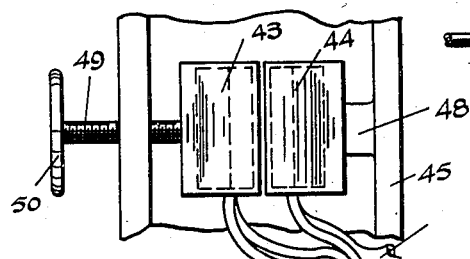
Figure 8:
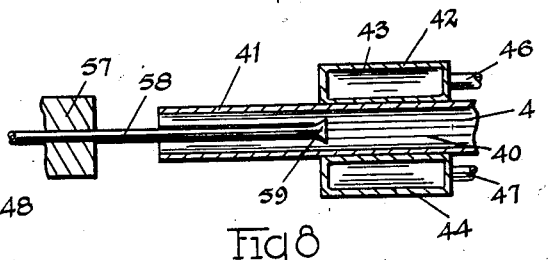
Figure 9:
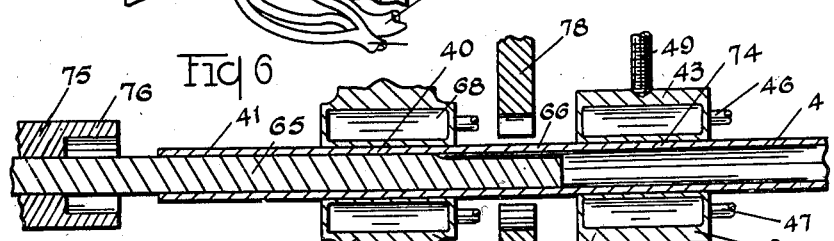
Figure 10:
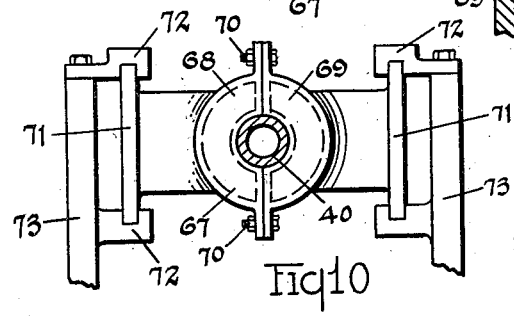
Figure 19:
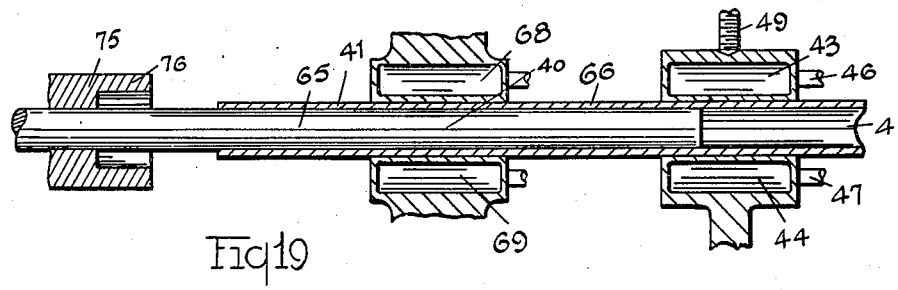
Figure 20:
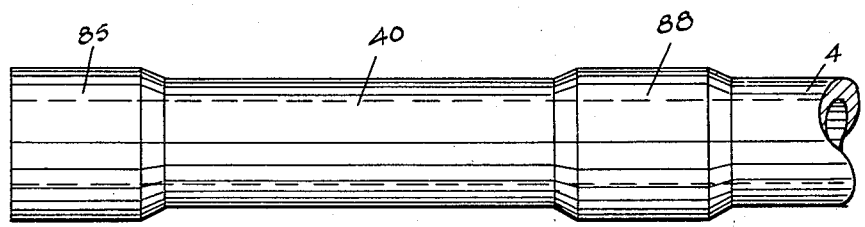
Figure 21:
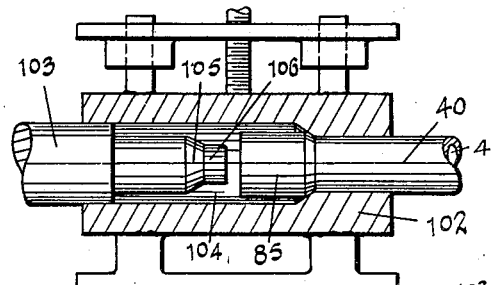
Figure 22:
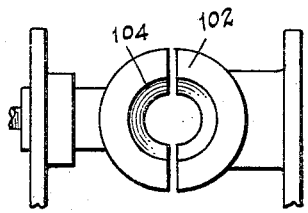
Figure 23:
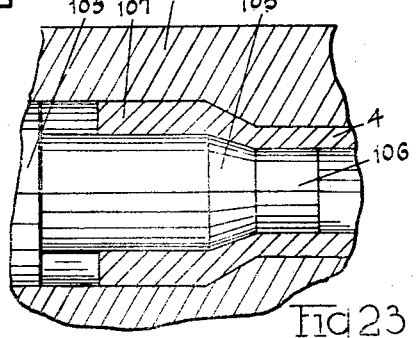
Figure 31:
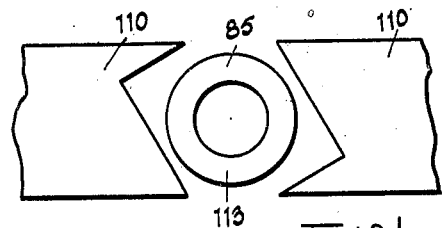
Figure 33:
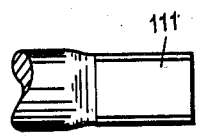
Figure 32:
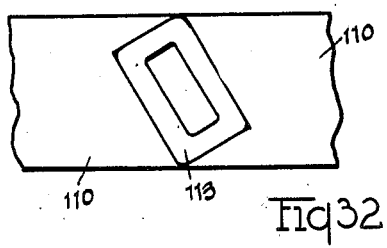
Figure 34:
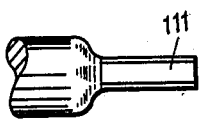
Figure 35:
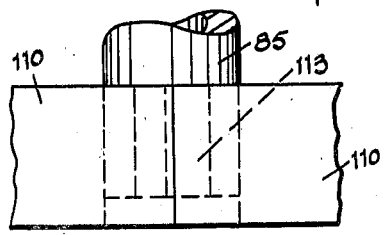
Figure 36:
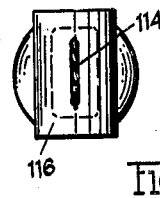
Figures 37, 38, 39:
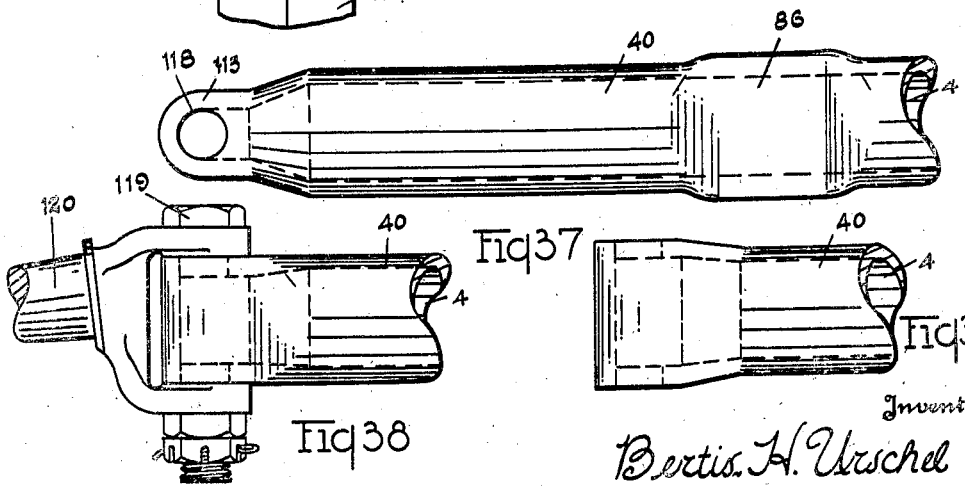

Fig. 1 illustrates a furnace showing local heating of portions of tubes. Fig. 2 illustrates a top view of the heat conductor, that may be so disposed as to conduct heat from parts of the tube contiguous to the portions that are heated for subsequent manipulation. Fig. 3 illustrates the upsetting operation. Fig. 4 illustrates a step of producing a uniform tapering temperature within a part of the tube to form a relative short tapering surface extending from the heated portion of the tube and whereby the tapering is controlled to produce a substantially uniform tapering in the tubes that are successively operated upon, notwithstanding the unavoidable slight variations to which the highly heated portions of the tubes may be subjected in advance of their being shaped. Fig. 5 illustrates an end view of the clamping members illustrated in Figs. 3 and 4. Fig. 6 is a top view of the clamp illustrated in Fig. 5. Fig. 7 illustrates the step of interiorly cooling the tube, at a point contiguous to the portion that has been highly heated, in advance of shaping it. Fig. 8 illustrates the exterior and an interior chilling operation. Fig. 9 illustrates the formation of the tube into shapes that depart from the exterior cylindricity of the tube at two points spaced from each other. Fig. 10 illustrates an end view of a floating clamp and chilling means located intermediate the heated portions. Fig. 11 illustrates a side view of the tube subsequent to the operations indicated in Fig. 9. Fig. 12 is a view of an intermediate section of the shaped portion of the tube shown in Fig. 11. Fig. 13 is a top view of a part of the tube shown in Fig. 11. Fig. 14 illustrates the dies for forming the portion of the tube shown in section in Fig. 12. Fig. 15 illustrates the dies in their closed position. Fig. 16 illustrates the tube shown in Fig. 11 subsequent to swaging the thickened end portion of the tube to produce the desired diameter in order that the tube may be shaped to have an oblong cross section of desired dimensions. Fig. 17 illustrates a part of the end of a tube wherein the diameter is reduced by swaging, additional upsetting, and subsequent swaging. Fig. 18 is an end view of a part of the tube shown in Fig. 17, when the end has been flattened to produce a substantially solid end portion. Fig. 19 indicates operations on the tube wherein the inner diameter of the tube is maintained during the upsetting of two spaced heated portions of the tube. Fig. 20 illustrates a view of the tube after two portions have been upset, in the manner indicated in Fig. 19. Fig. 21 illustrates the expansion of the end portion of the tube, illustrated in Fig. 20, by the use of a die and expander. Fig. 22 illustrates an end view of the die shown in Fig. 21. Fig. 23 illustrates the end portion of the tube and the parts of the die and expander after the end portion has been expanded. Fig. 24 indicates an expanding operation wherein a portion of the tube is expanded to form an oblong cross section. Fig. 25 illustrates the expanded portion indicated in Fig. 24. Fig. 26 illustrates shaping of the exterior of the expanded portion shown in Fig. 25. Fig. 27 indicates the completed operation of shaping the portion of the tube shown in Fig. 26. Fig. 28 illustrates a cross section of the tube when it has been completely formed by the operations indicated in Figs. 24 to 27. Fig. 29 is a side view of an end part of the tube. Fig. 30 illustrates an end view of the tube when it has been closed by inturning of the end edge. Fig. 31 indicates the method of formation of the end of the tube. Fig. 32 illustrates an end view of the tube after it has been formed. Fig. 33 illustrates a side view of the mandrel that may be used to form the end of the tube in the shape illustrated in Fig. 32. Fig. 34 is a top view of the mandrel shown in Fig. 33. Fig. 35 indicates the end closing operation and the formation of a cylindrical end surface. Fig. 36 is an end view of the tube upon completion of the operation indicated in Fig. 35. Fig. 37 illustrates a top view of the tube shown in Fig. 16 when its end has been shaped in the manner indicated in Fig. 35. Fig. 38 illustrates the end part of the tube, shown in Fig. 37, connected to a stub axle. Fig. 39 illustrates a side view of the tube illustrated in Fig. 11 when it has been shaped in the manner indicated in Fig. 35.

The tubes are, preferably, heated, to heat end portions uniformly, while adjoining parts are maintained at as low a temperature as possible, particularly, at points contiguous to the portions that are to be altered in shape, to prevent deformation, not only in that portion of the metal that forms the portions that are to be shaped, but also of the parts of the tubes that adjoin the portions to be shaped, that is, to prevent irregular ridging of the metal at the point of juncture between the portions that are to be upset and the adjoining parts of the tubes. If the adjoining parts of the tube are cooled or chilled to conduct away the heat from the point contiguous to the portions of the tube to be upset without shielding or chilling during the heating of the said portions, the subsequent chilling operation is improperly extended in time and there follows a too greatly extended tapering temperature into the portion that is to be upset. By chilling or shielding the part adjoining the portion to be upset during the heating of the portion, the portion to be upset may, immediately after the heating, be operated upon if the part that was chilled, or shielded, is placed in a clamp. Preferably, the part adjoining the part to be upset is placed in the clamp that will chill the metal, the part that has been uniformly heated may then be immediately shortened, the shielding during the heating of the said portion, and the subsequent chilling action of the clamp, operating to prevent the metal within the said adjoining part from materially thickening at a point contiguous to the heated portion and also prevents the metal of the uniformly heated portion from wrinkling over or upsetting onto the said adjoining part. This prevents the formation of any stresses or strains within the metal, or of weak spots that are liable to cause fracture.

Where the tubes are to be heated uniformly throughout two portions that are located in spaced relation, they are, preferably, chilled by a stream of fluid, such as a current of air or a spray of water, that is directed over the intermediate portion of the tube. In Fig. 1 is illustrated a furnace wherein each tube may be heated uniformly throughout a single portion thereof and screened or chilled at a contiguous portion, or each tube may be heated uniformly throughout two portions, located in spaced relation, and chilled or screened at the intermediate part and at points contiguous to the said portions.

The furnace 1 is formed of refractory blocks 2, that are supported by a suitable frame work 3. The furnace 1 may partake of any suitable form, but is, preferably, so shaped that tubes may be passed through the furnace by any suitable conveyor and continuously heated as they pass through the furnace, and then removed when portions of the tubes reach the desired uniform temperature.

The tubes 4, in the form of construction shown in the drawings, are supported on a rotatable table 5, that may be provided with a plurality of gear teeth 6, that mesh with the pinion 7 located on the shaft 8. Rotation of the shaft 8 causes the teeth 5 to rotate slowly so as to move the tubes 4 circularly within the furnace 1.

The furnace 1 is, preferably, provided with two chambers 12 and 13, for the purpose of heating two portions of each tube. The chambers 12 and 13 are separated by a wall 14, formed by refractory blocks that are suitably supported. The wall 14 is formed to have a circular slot 15, formed by the ledge 16, and the blocks 17 that are supported by the frame 3 and a pedestal 18. The lower end of the chamber 13 is closed by the wall 19, except for the circular slot 21. The upper end of the pedestal 18 is shielded by means of the blocks 22. The slots 15 and 21 are in, substantially, alignment with each other in order that the tubes 4 may be inserted through the slots 15 and 21 and their lower ends placed on the plate or table 5.

In order to support the tubes 4 within the slots 15 and 21, an annular member 25 is supported by suitable brackets 26 on the plate 5. Preferably, the annular member is provided with a plurality of webs 27 that have openings 28 through which the tubes may be inserted when they are placed in the slots 21 and 15. The metal of the annular member operates as a shield to protect parts of the tubes contiguous to the portions heated within the chamber and conduct the heat away, thereby operating to keep the temperature of the contiguous parts down.

Preferably, the plate 5 is provided with a plurality of sockets in alignment with the openings 28 of the annular member 25, to maintain the tubes in a substantially vertical position. The plate 5 is rotatably supported on the pedestal by suitable bearings, such as the roller bearings 30, located on the shoulder 31 formed in the side wall of the pedestal and the lower end of the pedestal is provided with the bearing bushing 32 for supporting the end of the shaft 8. The pedestal 18 is also provided with a shelf 33 for supporting the blocks 20 of the wall 19.

The furnace 1 is heated by any suitable means, such as the gas burners 35, that are distributed over the exterior wall of the furnace and are located in the chambers 12 and 13. Preferably, the burners 35 are turned so as not to direct the blast directly against the sides of the tubes. This avoids intense local heating of portions of the tubes and enables uniform heating of the tubes at substantially the average temperature of the interior of each of the chambers.

The parts of the tubes located intermediate the portions placed within the chambers 12 and 13, and also the parts contiguous to and below the portion located within the lower chamber, are shielded from the high temperatures of the chambers by the bottom walls of the chambers. Also, cooling currents of a fluid, such as sprays of water or currents of air, may be directed against the parts of the tube located contiguous to the portions that are heated in the furnace. The streams may strike the tubes at the points located at the ends of the portions of the tube that it is desired to be heated, or they may be directed substantially perpendicularly against the tubes, so as to cause the streams to spread upward and downward. The wall 14 of the furnace may be made sufficiently thick in order to enclose the entire length of the part located intermediate the heated portions. The blasts of air, or sprays of water, may be located in planes, one above the other, in order to extend the length of the parts of the tubes that are thus shielded from the temperature of the chambers 12 and 13.

The means for shielding and chilling the tubes, at points contiguous to the portions that are heated, may be varied, the construction shown being merely illustrative of the various forms of furnaces that may be utilized, in order to keep the temperature of the parts of the tube contiguous to those that are to be subsequently shaped or manipulated in the formation of the tube, at a temperature that will prevent deformation of the said shielded portions and prevent undesired extension of the tapering of the temperature from the portion that is to be manipulated or shaped into the contiguous parts of the tube. The pipes 36 may thus be connected to a source of supply of water, or of air, that may be directed through suitable nozzles, or outlets, into the channels 15 and 21. Also, the pipes 37 may be connected to a pipe 38, that extends up into the pedestal 18 through which streams of air, or water, may likewise be directed into the slots 15 and 21 to maintain the intermediate portions chilled. Preferably, the outlets, or nozzles, of the upper row of pipes 36 and 37 are such as to produce a spreading spray, or air current, in order to extend the area vertically over which the cooling fluid is directed and thus chill, or keep the temperature down, over substantially the entire length of the part of the pipe located intermediate the portions within the chambers 12 and 13. If desired, two sets of pipes 36 may be located within the wall that separates the chambers 12 and 13 to maintain these parts of the tubes relatively cooler than the adjoining portions of the tubes. In view of the fact that the parts of the tubes within the slot 15 are located between the portions of the tubes that are in the chambers 12 and 13, the chilling stream is, necessarily, greater in quantity than is required to chill that portion of the tube located in the slot 21. Preferably, the cooling stream is directed to a point so that portions thereof will cool the parts of the tube contiguous to the ends of the uniformly heated portions.

When the portions of the tubes have been heated uniformly throughout their length, the heated portions are shaped as may be desired and according to the use to which the structure is to be subjected. Where the finished article is to be connected to parts of a structure, the heated portions are upset to thicken or render the walls solid in order to provide for the necessary connection and strength, according to the character of the connection that is to be made, that is, whether it is to be pivotally, clamped, or otherwise secured.

Where axles are formed of steel tubes, preferably seamless tubes, having a diameter sufficient to withstand the shearing stresses to which they may be subjected, are used. Ordinarily, the diameter of the tubes may be 2½ to 2¾ inches and the wall may be ⅛ of an inch in thickness. The parts of the tube may be upset to thicken the walls in one or two heats according to the thickness of the wall that it is desired to produce. In the formation of axles, from tubes of the character described, the portions of the tubes are heated to a substantially uniform heat for a length of 8 or 10 inches, and these portions are shortened to about 2 or 2½ inches. Preferably, the parts adjoining the heated portions, and particularly at the points contiguous to the end of the heated portions, are chilled when the heated portions are shaped, to prevent any deformation of the parts adjoining the heated portions.

The tube may be chilled by conducting the heat from points contiguous to the heated portion through either the interior surface of the tube or through the exterior surface. Thus, a clamp may be used which will conduct the heat away from the exterior surface of the portion adjoining the heated portion. Preferably, such a clamp is provided with a heat removing means, such as may be produced by a water cooled clamp, which will quite rapidly cool the part of the tube adjoining the heated portion, and particularly locate the chill at a point contiguous the end, or ends, of the heated portion. If desired, air, or a spray of water, may be directed against the surface of the tube for chilling the part contiguous to the heated portion.

Also, both the interior and the exterior surfaces of the part of the tube, contiguous to the heated portion, may be chilled at the same time. The chilled surfaces are particularly effective in preventing undesired deformation at a juncture of the heated portion and the cooler portion of the tube in the upsetting of the tube. Consequently, the interior may be cooled by a blast or spray of a cooling fluid and, if desired, at the same time the exterior surface may be similarly cooled or may be cooled by a clamp, the clamp having sufficient metal to rapidly conduct heat from the exterior surface of the tube, or, if desired, the clamp may be chilled by a cooling fluid passing therethrough.

In the formation of the tube, in the manner illustrated in Fig. 3, the part 40, located adjoining the heated portion 41 of the tube 4, is clamped, preferably, by means of a water cooled clamp 42. The clamp 42 may be formed of two hollow parts 43 and 44 that may be supported in a suitable frame 45 and water may be conducted to the clamps 43 and 44 by means of the pipes 46 and the water may be conducted away from the clamps through suitable pipes 47. One of the clamps may be secured to the frame as by the shank, or bar, 48, and the other of the clamps may be supported on the end of a screw 49 that is rotatably connected to the clamp. The screw 49 extends through a part of the frame 45 and may be provided with a suitable handle, such as the handle 50, to tightly press the clamp 44 against the tube and, thus, clamp tightly the tube 4 between the clamps 43 and 44. This will locate a chilling medium in close proximity to the end of the heated portion 41 as at the point 51.

Where, however, it is desired to produce a defined heat tapered portion, to insure uniform variation in the thickness of the wall from within the length of the heated portion to the thin wall of the body of the tube, that is, to produce a tapering interior surface, the length of the tapering temperature from the end of the highly and uniformly heated portion, may be controlled by the rate of change of conductivity along the clamp. In the form of construction shown in Fig. 4, hollow clamps are provided with tapered interior surfaces 55 that form walls that are thicker at the end of the uniformly heated portion of the tube, than the portions of the walls located remote from the heated portion. A cooling fluid is conducted to and away from the clamps by means of the pipes 46 and 47 which operates to chill the clamps, but the inner walls 56 of the clamps control the conductivity of the heat away from the tube so as to produce a substantially uniform rate of change of temperature throughout the part 40, per unit of length, from the heated portion 41. Thus, when the heated portion 41 is shortened by the operation of the ram 57, the chilled portion of the tube will be sustained and prevent deformation of the portion as it is crowded against the chilled part. Where the tapering temperature is controlled and rendered uniform in its rate of change per unit of length, there will be produced a movement of the metal which, however, will vary according to the length of the tapering temperature, within certain limitations. Where the length of the tapering temperature is too great, or is irregular, undesired deformation will be produced with the result of interior stresses and strains that produces weak spots in the structure.

If desired, the interior surface may be cooled by a blast of air, or a spray of water, that may be directed through a tube 58 that extends through the ram 57. The end of the tube 58 may be provided with a suitable nozzle, such as a bell or flaring nozzle 59, which at the outlet will produce a spreading spray of water, or a spreading current of air, that will cause the fluid to strike the inner surface. Preferably, the nozzle 59 is located at a point contiguous to the end of the uniformly heated portion 41 of the tube 4. When the tube has been clamped about the part 40, the ram 57 may be operated to shorten the portion 41. Also, if desired, the tube 4 may be clamped by an exterior chilling clamp, such as the clamp 42, and cooled thereby, as well as cooled by the stream of fluid that may be directed into the interior of the tube by the pipe 58. When, therefore, the ram 57 forces the heated portion 41, it will be shortened and undesired deformation prevented.

If desired, the interior surface of the portion 41 may be sustained by a suitable mandrel so as to maintain the interior cylindricity with the consequent increase in the exterior diameter of the tube in the upset portion. Thus, if desired, a mandrel 65 may be inserted in the tube 4 and, when operated upon by a press, will maintain uniform the interior diameter while the exterior diameter of the portion will be increased according to the difference in length of the portion 41 before and after the upsetting operation.

Where it is desired to shape two portions of the tube, the tube may be heated in the furnace 1 so as to produce uniform temperatures throughout the said portions, the tube being shielded at points contiguous to the portions that are to be manipulated. Thus the tube may be heated uniformly throughout the portions 41 and 66, which are separated by the part 40 of the tube. The parts of the tube, contiguous to the ends of the heated portion, may be chilled by the clamps 67 and 42. The clamps 67 are, preferably, floating clamps or dies, that move with the shortening of the portion 66 of the tube 4.

The clamps 67 may be formed of two parts 68 and 69 that may be clamped about the portion 40 of the tube 4 by means of suitable bolts 70. The clamps are connected to plates 71 that are guided in suitable ways 72, that are supported on the frame 73, whereby the clamp 67 may be readily moved towards the chilled portion 74.

In order to maintain the cylindricity of the tube in the portions 41 and 66, when it has been shortened, the mandrel 65 may be located in the said portions in advance of the operation of the ram. Where either of the portions 41 and 66 are to be changed from the substantially cylindrical to some other shape, such as flattened, the portion of the mandrel 65, that is located at the point where the metal of the tube is to be altered from the cylindrical, may be correspondingly shaped so as to make the interior surface of the tube, at that point, conform to the desired shape. The exterior of the tube may be die pressed to shape the interior surface of the tube as desired, provision, however, being made for the withdrawal of the mandrel.

In the operations indicated in Fig. 9, the mandrel 65 may be inserted in the end of the tube 4 and the clamps 42 and 67 may be inserted in the end of the tube 4 and the clamps 42 and 67 may be located in position for maintaining the parts of the tube in axial alignment, and the ram 75 may be operated so as to shorten the portions 41 and 66 and, at the same time, engage the clamp 67 so as to insure the proper shortening of the portion 66 of the tube. The ram 75 may move along the mandrel 65. The ram 75 may be provided with an overhanging ledge 76 that will engage the clamp 67, when the portion 41 has been shortened to the desired extent and, upon further movement of the ram, the portion 66 will be shortened.

If it is desired to shape the lateral surfaces of the heated portions, it may be done by forming the surface of the mandrel so that it will correspond to the formation, that it is desired to produce in the tube, in order to sustain the inner surface of the tube while it is being operated upon exteriorly by suitable dies. Thus, if it is desired to flatten the portions 66, the mandrel 65 is flattened so as to sustain the inner surfaces of the exterior tube during the upsetting operation at points that will enable surface flattening after the portions 66 have been shortened. When the portion 66 has been shortened to thicken its wall, dies may be used for shaping it to the desired shape. Thus, while the mandrel is still within the tube, the dies 78 and 79 may be forced against the lateral surfaces of the tube to form the exterior of the tube to the desired configuration.

The tube may be shaped, in the operations as illustrated in the Figs. 11 to 15, wherein is formed the thickened wall end portion 85 and the flattened thickened wall portion 86. The portion 85 affords a connecting portion for the stub axles of a vehicle while the portion 86 affords a thickened wall portion and shape suitable for connecting the spring pads of the vehicle. To further increase the thickness of the walls of the portion 85, it may be swaged, as indicated at 100, or to still further thicken the walls it may be further upset, or, if suitable thickness will be given to the portion 85, by swaging it to a smaller diameter, it may be done, as indicated at 101. The thickened portion may then be flattened to make it solid as shown in Fig. 18 at 109.

A mandrel 89 may be used for expanding the portion 88 to form an oblong cross section 97. A slotted mandrel 89 may be located in the tube so as to position a block 90, located in a recess 91 in the mandrel, within the portion 88 which has been formed from the portions 66 in the manner indicated in Fig. 19. Within the slot 92 of the mandrel 89, is located a bar 93 having an inclined edge, or cam surface 94, that engages the underside of the block 90 and raises it within the recess 91, as the rod is moved along the slot. The block 90 is also guided in its upward movement by the pins 99. When the portion of the tube engaged by the block 90 has been raised, the portion 88 may be shaped exteriorly by a pair of dies 95 and 96, in the manner shown in Figs. 26 and 27. There will thus be formed the oblong cross section 97 which is particularly advantageous in shape for connecting the axle to a vehicle.

If desired, the underside of the mandrel may be cut away as at 98. When the dies 95 and 96 are forced towards each other to shape the section 97, part of the portion 88, located below the block 90, is forced into the interior of the tube so as to locate the exterior surface of the portion 88 below the block substantially in line with the cylindrical surface of the body of the tube. Thus, the interior surface of the portion 88 below the block will be raised into the space that is formed between the end of the mandrel 89 and the interior of the tube. If it is desired to indent the portion located on the side of the axis of the tube, opposite to that on which the block 90 is located, it may be done by further cutting away the end of the mandrel to increase the space formed between the end of the mandrel and the wall of the tube. When, therefore, the dies 94 and 96 are forced together, the lower side will be depressed against the body of the mandrel as provided by the flattening of the mandrel at 98.

The portion 88 may also be shaped, when properly heated, by placing it within dies, such as the dies 95 and 96, and then while holding the adjoining parts of the tube at right angles to the faces of the dies, or parallel to the axis of the faces of the dies, or parallel to the axis of the heated portion 88, moving them downward with respect to the dies when the heated portion 88 is held from such downward movement. Thus the axis, or axes, of the adjoining parts of the tube are displaced with reference to the axis of the portion 88 and may be, if desired, maintained parallel to the axis of the portion 88, or the outer end part, namely, the part 40, may be turned angularly upward.

Thus the shaping of the metal, within the portion 66, of the tube, may be varied according to the most advantageous results that it is desired to anticipate in a structure.

Also, the end portion 85 may be, if desired, expanded. In order to expand the end portion 85, it may be placed in a die 102 and an expanding member 103 may be forced into the end of the tube 85. Preferably, the expanding member 103 is connected to a ram and is guided, or piloted, by means of the die 102. Preferably, the die 102 is made in the form of a pair of clamps for clamping the end of the tube and forming a guide for the expanding member 103. The clamping members, or die 102, is provided with a cylindrical chamber 104 having a diameter substantially the same as that of the end portion when expanded. The expanding member 103 is provided with a tapered portion 105 that causes expansion of the metal of the portion 85 of the tube. It also has an end portion 106, cylindrical in form, that corresponds substantially to the inner diameter of the body of the tube 4, which may act as a pilot upon the completion of the stroke of the expanding member. The end portion of the tube will then be provided with a portion 107 that will have an inner diameter greater than the diameter of the body of the tube.

The end portions of the tubes are expanded or contracted and shaped, as may be desired, to provide for the connection of the stub axle to produce the maximum resistance to torque and shearing stresses that the end of the main axle is subjected through the stub axle. Consequently, if the distance between the points of the yoke of the stub axle, or of the main axle, are broad, and it is desired to maintain the tubular structure to the ends of the axle, the tube may be expanded in order to provide for this larger transverse dimension. If, however, the distance between the arms of the yoke is small, the parts of the axle may be contracted. If it is desired to reduce the thickness of the end of the axle, it may be done by pressing opposite sides to practically close the interior space between opposite side walls to form a substantially solid end in the axle, which may be shaped as desired.

Where the end of the axle is to be maintained hollow, the end portions may be shaped, by means of suitable dies, into an oblong or substantially rectangular cross sectional shape. The oblong shape may be so formed as to have variable cross dimensions. These dimensions should be determined by the exterior and interior diameter of the end portions. Preferably, the oblong rectangular cross sectional shapes will, in their outline, have a total length of surface substantially equal to the circumference of the outer circle of the cross section of the cylindrical end portion from which the oblong shapes are formed. Thus, the end portions may be shaped by a pair of dies 110 and by the use of suitable rectangular arbors, such as the arbor 111. The major cross dimension of the arbor 111 is substantially the same as the inner diameter of the end portion of the tube, such as the end portion 85 of the tube shown in Fig. 11.

When the dies 110 have shaped the end of the tube into an oblong cross section, a plunger 112, having like cross section, is forced into the dies 110 to force the edge 113 inward towards the axis of the tube and thus close the end of the tube. The portions of the edge will meet, as at 114, to substantially completely close the tube. Preferably, the die 112 has a cylindrical surface 115 and, in turning the edge in, the metal will flow, or be crowded, over the surface 115 to form the cylindrical surface 116 that extends across the end of the tube. The end of the tube is then bored, as at 118, preferably substantially in the axis of the cylindrical surface 116, for the king pin 119 of the stub axle 120. The same may be done to close the ends of tubes having large or small diameters to form the parts as shown in Figs. 18, 30, 37, and 39.

I claim:

1. The process of shaping a steel tube which consists in heating it to produce a substantially uniform heat throughout two portions of the wall of the tube and at the same time chilling the portion of the tube at points between the heated portions and then moving the parts of the tube to alter the lengths of the heated portions.

2. The process of shaping a steel tube which consists in heating it to produce a substantially uniform heat throughout two portions of the wall of the tube and at the same time chilling two portions contiguous to the heated portions and then clamping the chilled portions and forcing one heated portion towards one chilled clamped portion and the said last named chilled clamped portion towards the other chilled clamped portion of the tube.

3. The process of shaping metal tubes which consists in heating a portion thereof to produce a substantially uniform heat throughout the said portion, forcing parts of the tube towards each other to shorten the heated portion, sustaining the interior surface of the said portion of the tubes to produce the desired interior cross sectional configuration as the said portion is shortened, expanding cylindrically the said portion and forming the said portion substantially oblong in cross section.

4. The process of shaping a cylindrical tube of metal which consists in heating two portions of the tube to produce a substantially uniform heat throughout the said portions, one of which portions forms an end portion of the tube and the said portions separated by a cooler portion and leaving a second cooler portion of the tube, forcing the cooler parts of the tube towards each other to shorten the heated portions, sustaining a part of the interior surface of the heated portion other than the heated end portion and flattening the unsustained part of the heated portion other than the said end portion and forcing opposite edge portions of the end of the heated end portion towards the axis of the tube to substantially close the end of the tube.

5. The process of shaping a tube, which consists in heating it to produce a substantially uniform heat throughout a portion of the wall of the tube and at the same time rapidly withdrawing conducted heat from the wall of the tube contiguous to the heated portion and then moving portions of the tube longitudinally and relative to each other to vary the length of the heated portion.

6. The process of shaping a metal tube, which consists in heating throughout two portions of the tube separated by a third cooler portion, then directing a heat removing medium against the interior surface of the third portion to remove conducted heat therefrom and, at the same time, altering the length of the heated portions by pressure.

7. The process of shaping a steel tube, which consists in heating two portions separated by a cooler portion clamping the cooler portion and introducing a chilling medium in the region of the clamped portion to chill the clamped portion, and at the same time, reducing the lengths of the heated portions by pressure.

8. The process of shaping a steel tube, which consists in heating two portions separated by a cooler portion clamping the cooler portion and introducing a chilling medium in the region of the clamped portion to chill the clamped portion, and at the same time, reducing the lengths of the heated portions by pressure while sustaining parts of the interior surfaces of the said heated portions to produce desired interior configurations of the surfaces of the said heated portions.

BERTIS H. URSCHEL.